Figure 6:
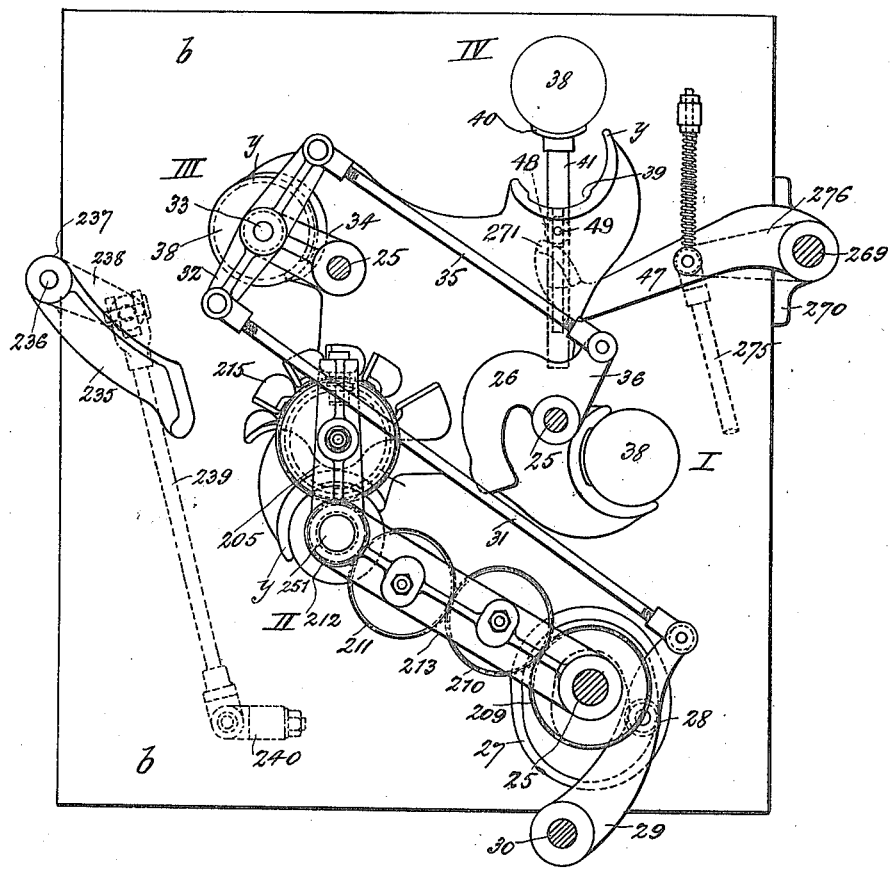

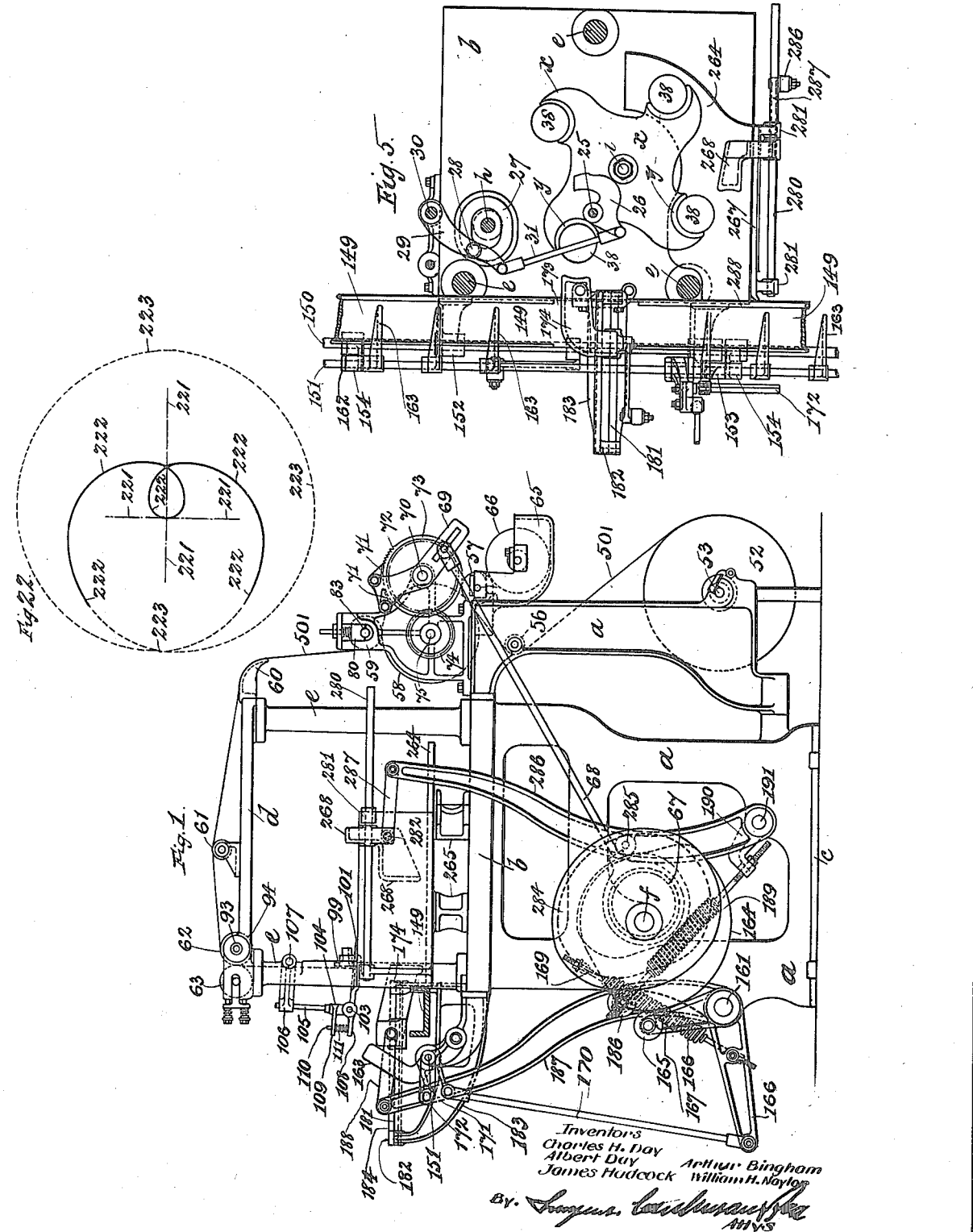

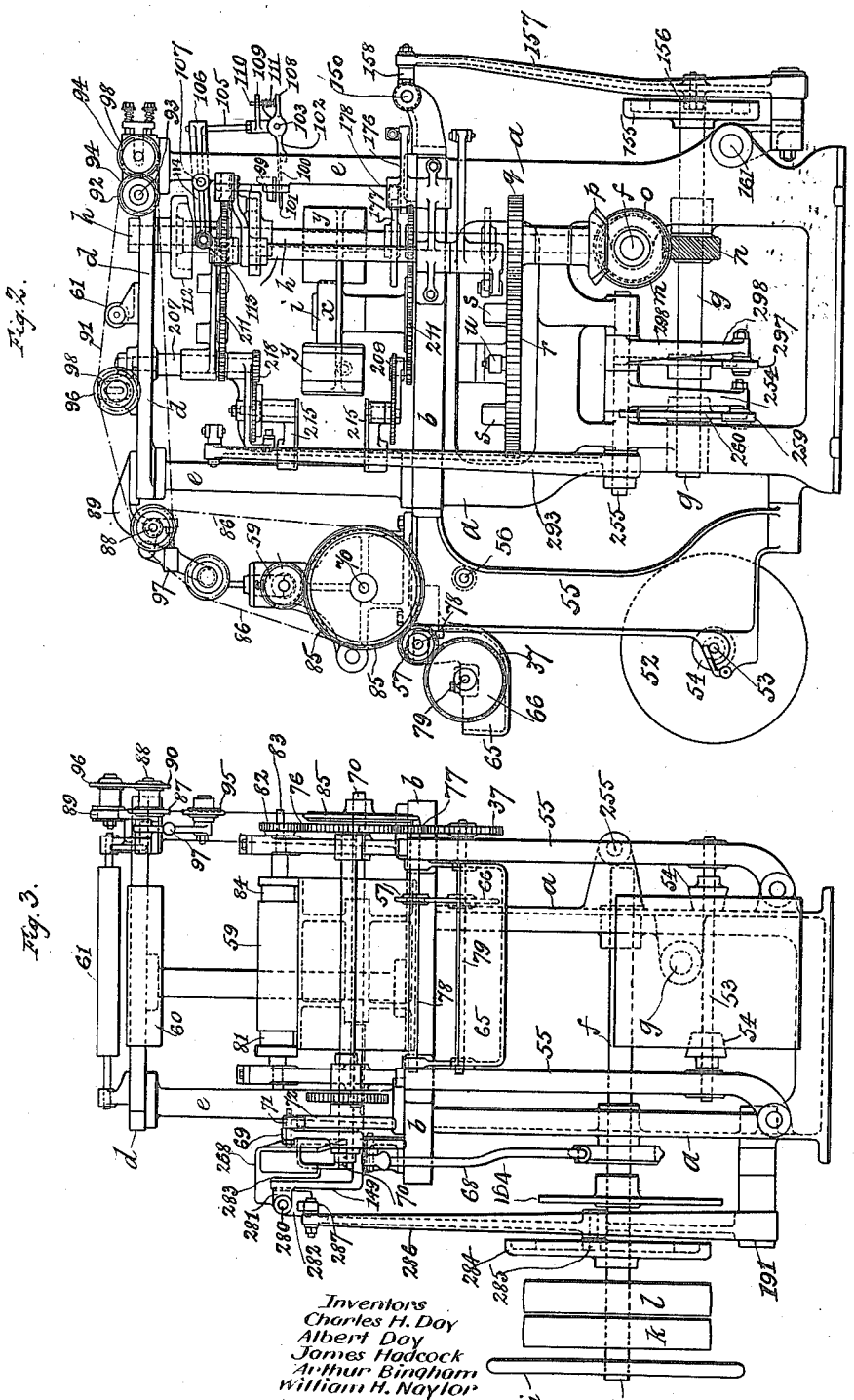

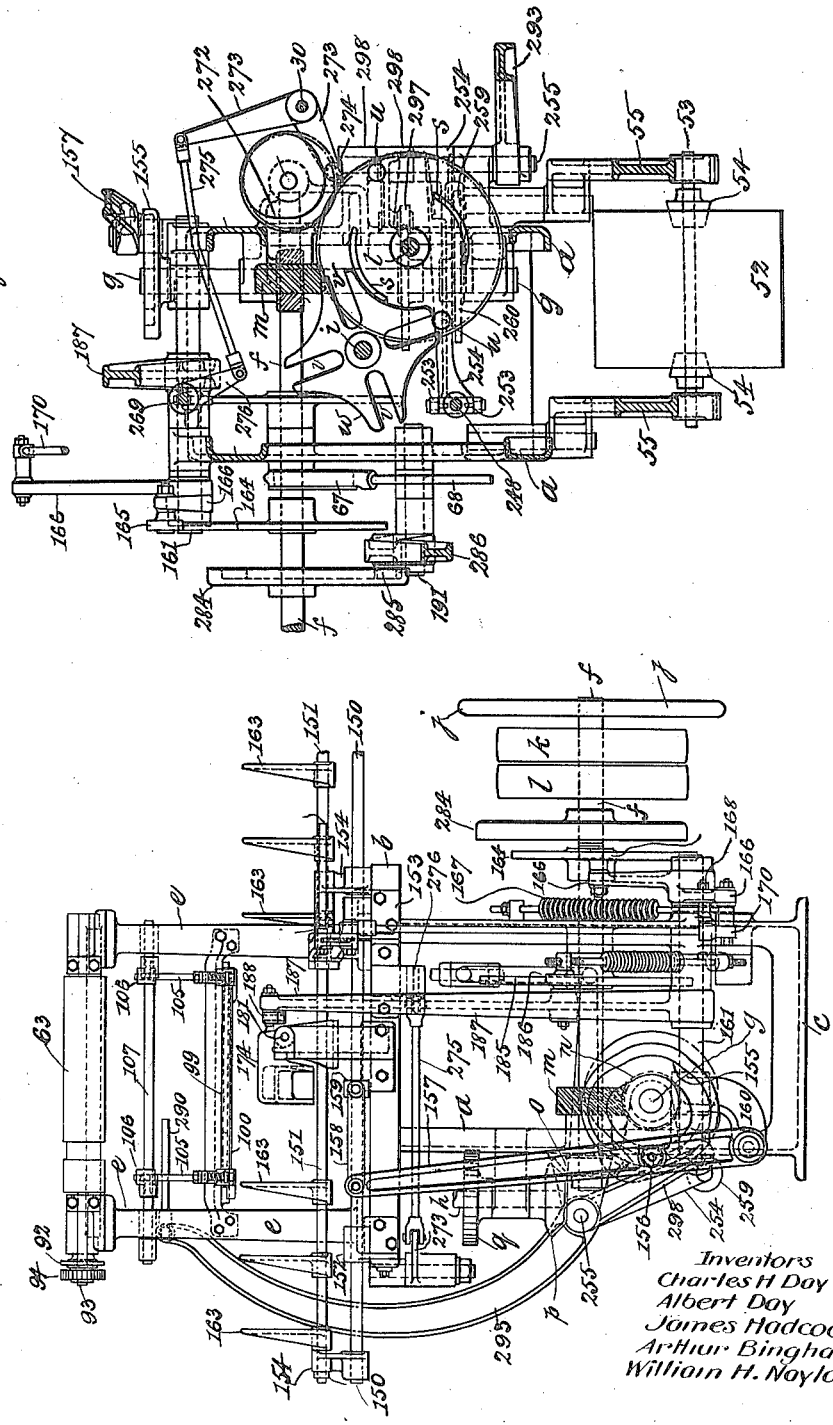

Inventors
Charles H Day
Albert Day
James Hadcock
Arthur Bingham
William H Naylor

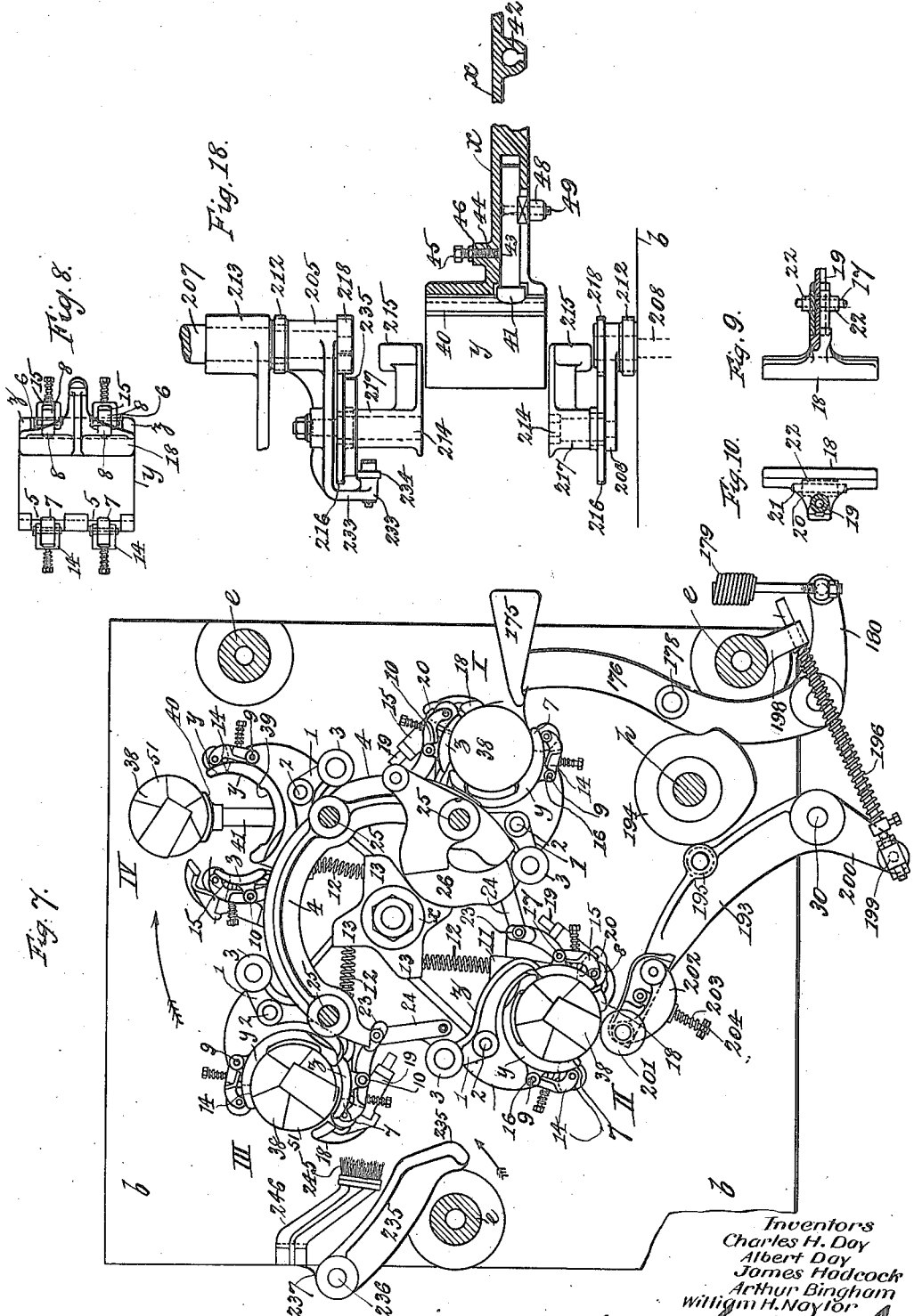

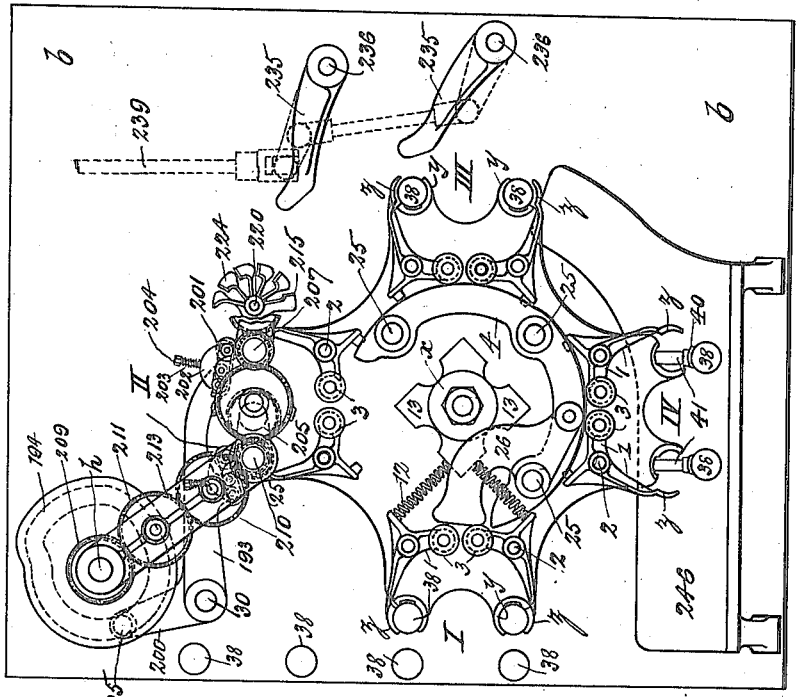

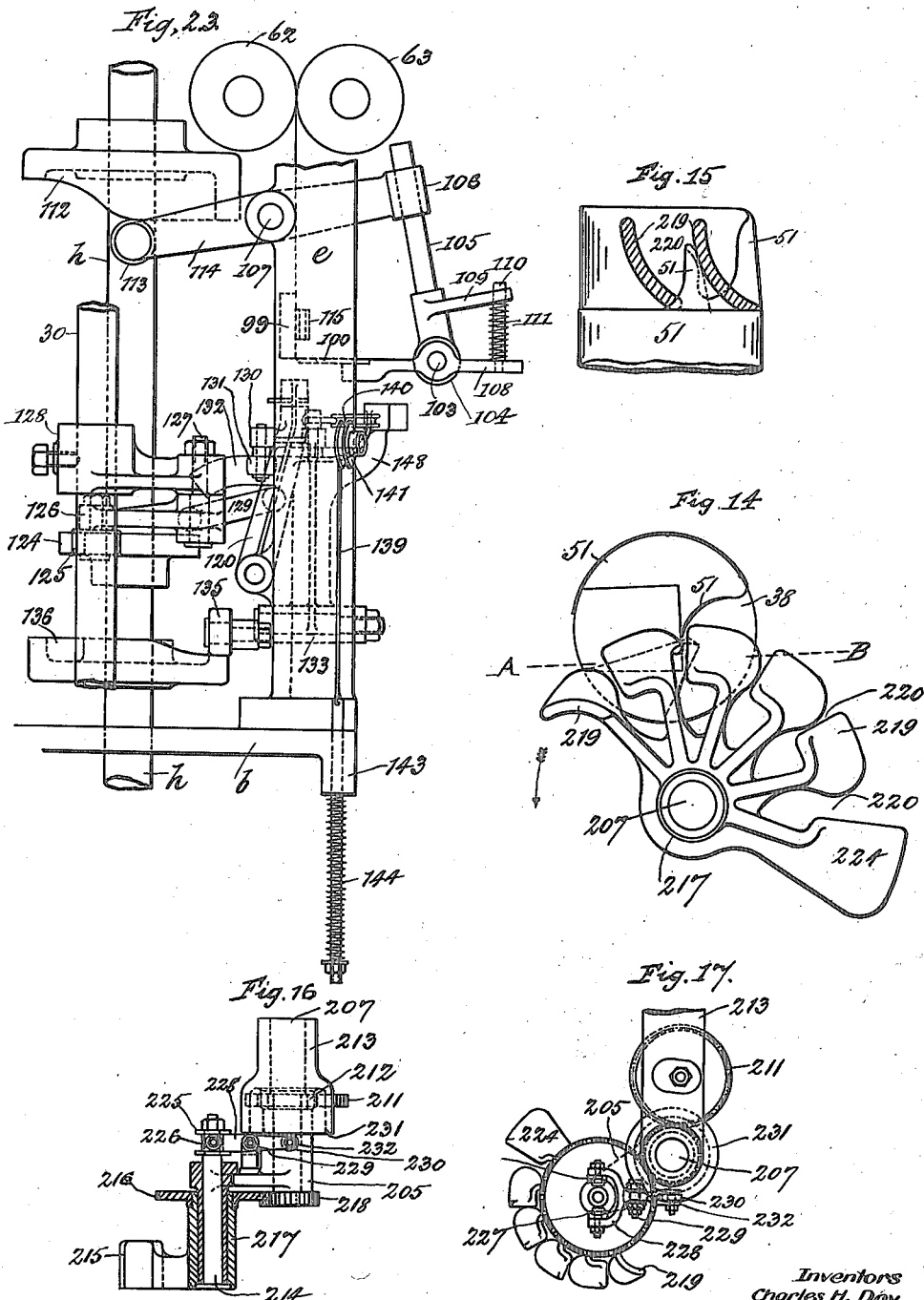

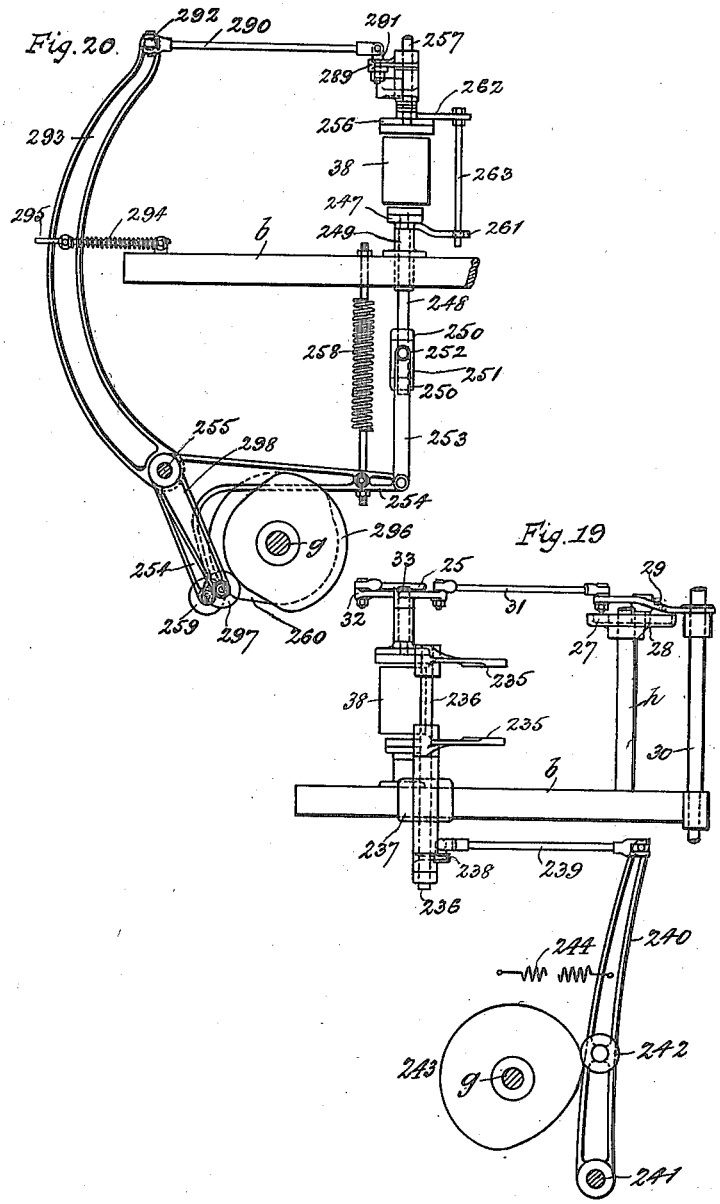

UNITED STATES PATENT OFFICE.

CHARLES HERBERT DAY, ALBERT DAY, JAMES HADCOCK, ARTHUR BINGHAM, AND WILLIAM HENRY NAYLOR, OF LEEDS, ENGLAND.

WRAPPING AND LABELING MACHINE.

1,180,984.          Specification of Letters Patent.     Patented Apr. 25, 1916.

Application filed January 25, 1916. Serial No. 74,089.

*To all whom it may concern:*

Be it known that we, CHARLES HERBERT DAY, ALBERT DAY, JAMES HADCOCK, ARTHUR BINGHAM, and WILLIAM HENRY NAYLOR, residing, respectively, at 129 Belle Vue road, Leeds, in the county of York, England, 36 Delph Lane, Leeds aforesaid, "North Inch," Shaftesbury avenue, Roundhay, Leeds aforesaid, 102 Markham avenue, Harehills, Leeds aforesaid, and 4 Kings Place, Headingley, Leeds aforesaid, have invented new and useful Improvements in Wrapping and Labeling Machines, of which the following is a specification.

This invention relates to machinery or apparatus for automatically inclosing or wrapping jam and other jars, bottles and other receptacles, article or packages,—all of which are hereinafter termed and included in the term "jar",—in paper or other wrapping material,—hereinafter termed as "wrapper." The said wrapper may either be plain or printed so as to form a label, or a label may be previously or subsequently attached thereto.

The hereinafter described machinery or apparatus is applicable for wrapping and labeling round, or square, or rectangular, or other shaped jars, and can be applied to the ends thereof, as well as to the sides of the jar,—or other article,—to inclose it completely while it is maintained in an upright or vertical position throughout the sequence of operations without disturbing the initial vertical axis of the article.

This invention is particularly applicable for wrapping jars containing liquids, or syrups, or powdered dry goods where the contents are such as would be liable to flow or spill.

Hitherto in machinery or apparatus employed for wrapping a jar or other receptacle containing a liquid or semi-liquid material, or material in powder form, it has been customary to entirely close up the receptacle and apply the wrapper or label thereto while each article or receptacle has been in a horizontal position. Further, round or disk-like, or cylindrical articles in an upright position have been inclosed in cardboard and outside wrappers by the article being set in rotation by a plurality of wrapping rollers.

In machinery constructed according to this invention the jar or other article to which the wrapper or label is applied is placed, as before mentioned, in a vertical or upright position,—and remains in that position without disturbing the initial vertical axis of the jar during the whole of the wrapping operations,—and means are provided for first passing the wrapper partly around the vertical or upright surface or surfaces of the jar as it is being placed in the folding portion of the machine with the top and bottom edges or ends projecting, after which the sides of the wrapper are closed over each other to form the vertical seam, and then the top and bottom edges of the wrapper are folded over the ends of the jar when required.

In the accompanying drawings means are shown for carrying the invention into practice, in which—

Figure 1. is a side elevation looking from the pulley end of the machine; Fig. 2. a side elevation looking from the opposite end of the machine to Fig. 1; Fig. 3 is a back elevation of the machine; Fig. 4. is a front elevation of the same; Fig. 5. is a part plan of the machine with the platform and paper carrying rollers removed; Fig. 6 is an enlarged part plan showing the means for driving the rotary end folders, the turning of the jars in the pockets of the jar wheel, and means for ejecting a wrapped jar out of the jar wheel; Fig. 7. an enlarged part plan showing the movable platform which supports the jar as it passes from the trough to a pocket in the jar wheel, the spring controlled loose sides of the pocket of the jar wheel, and means for closing the vertical sides of the wrappers and for wiping the seams and end folds; Fig. 8. is an enlarged elevation of a pocket of the jar wheel showing the spring controlled sides or jaws attached thereto; Fig. 9. an enlarged part front and sectional elevation of the T-shaped folder; Fig. 10. an enlarged end elevation of the same; Fig. 11. a sectional plan of the lower part of the machine with the table removed. This view is drawn to the same scale as Figs. 1 to 4. Fig. 12. an enlarged front elevation of the guillotine or other knife and wrapper carrying mechanism; Fig. 13. is an enlarged plan of the gripper carrying mechanism; Fig. 14. an enlarged plan of the end folder; Fig. 15. an enlarged part elevation on line A, B, Fig. 14 of end folder with a fold of the wrapper in the folding blades; Fig. 16. an enlarged part sectional elevation of an end folder with means for automatically raising and lowering the same; Fig. 17. a plan of same; Fig. 18. an enlarged part sectional elevation of one form of end folder; Fig. 19. an elevation of the end wipers and jar turning mechanism drawn to the same scale as Figs. 1 to 4; Fig. 20. an elevation of the jar turning and pressing mechanism; Fig. 21. a plan of the jar wheel with "twin" or multiple pocket arrangement; Fig. 22. a diagrammatic view illustrating the epicycloidal path of a point on the rotary folders in closing the end folds of a wrapper on to the ends of the jar; Fig. 23. an enlarged elevation of the guillotine knife and arrangement of wrapper carriers.

Like parts in all the views are marked with similar letters of reference.

The framework of the machine consists of standards $a$, $a$ fixed to a table $b$ and to a base plate $c$. Above the table is a platform $d$ supported by pillars $e$, $e$, $e$. The driving shaft $f$, cam shaft $g$, vertical shaft $h$ and vertical jar wheel shaft $i$ are carried by bearings on the framework. A hand wheel $j$ and fast and loose pulleys $k$, $l$ are fixed upon the driving shaft $f$ and a rotary motion is imparted thereto from any suitable source of power by a belt, not shown in the drawings.

The cam shaft $g$ is driven from shaft $f$ by spiral gearing $m$, $n$, and a rotary motion is imparted to the vertical shaft $h$ by bevel gearing $o$ and $p$.

An intermittent rotary motion is imparted to the jar wheel shaft $i$ from the vertical shaft $h$ by means of spur wheel $q$, intermediate wheel $r$ fixed to, or forming part of barrel $s$, mounted upon stud $t$, bowls or runners $u$ mounted on the barrel $s$ adapted to engage with slots $v$ of a star wheel $w$ fixed to the lower end of the jar shaft $i$.

$x$ is the jar wheel mounted and fixed upon the top of the jar wheel shaft $i$ immediately above the table $b$. The jar wheel is either made in the form of a plate with a number,—say four, or six, more or less,—pockets or recesses $y$, $y$, (Fig. 7) formed therein, or the jar wheel is made of a number of arms attached to a central boss with the pockets formed on their outer ends.

The pockets $y$, $y$, are shaped to suit the contour of the article to be vertically wrapped and labeled. That is to say, if a round article,—as shown in the drawings,—is to be wrapped, then the pockets and portions forming them would be made to conform to the part of a circle; but if a square or rectangular jar is to be wrapped and labeled, then the pockets would be correspondingly shaped to receive the same. The pockets in the jar wheel which turns about the vertical axis of shaft $i$ are open at the top and bottom, and their centers are parallel with the axis of the said shaft and with their mouths directed away from said axis.

In some cases a portion of the pocket, say, one half, is cast or otherwise formed in the jar wheel, and the other half or mouth of each pocket is completed and formed by a number of jaws or folders hinged or otherwise jointed thereto and arranged as at Fig. 7.

To each of the pockets $y$ of the jar wheel is or are jointed one or more movable jaws or sides $z$,—hereinafter termed the "movable sides",—each of which is provided with a horizontal projecting arm 1 so as to be capable of being moved toward and away from one another. As the machine operates on successive jars in identical fashion a description of its treatment of one jar will suffice. In the drawings each pocket $y$ is shown with one movable side $z$ and arm 1. The movable side $z$ is provided with a projection 11 against which the spring 12 is made to act for keeping the said movable side against the jar. The opposite end of the spring acts against one of the projections 13 of the boss of the jar wheel. The horizontal arm 1 and movable side $z$ are shown in the drawings formed in one casting, but if desired the jaw or side may be jointed directly to the fixed portion of the pocket instead of being mounted upon the pivot 2 attached to the plate portion of the jar wheel. The arm 1 is also provided with a bowl or runner 3 mounted thereon adapted to work against a fixed cam 4. The outer vertical edge of each jaw is provided with one or more recesses. In the vertical edges of the fixed portion of the pocket $y$ and also of its movable side $z$ is or are formed one or more, say, two, horizontal recesses 5, 5, 6, 6, (Fig. 8) in which are arranged to work antifrictional rollers 7, 8 which are employed to aid in closing the vertical edges of the wrapper over each other and for holding the jar in position. The anti-frictional rollers 7, 8 are mounted upon adjustable spring controlled levers or fingers 14, 15, and the said levers or yielding fingers are jointed to lugs 9, 10 (Fig. 7) formed on, or fixed respectively to the perimeter of the pocket $y$ and movable side $z$. The spring controlled levers or yielding fingers 14, 15 are mounted upon spindles 16 and 17 carried by the lugs 9, 9, 10, 10.

To the movable side $z$ is jointed,—if so desired,—by means of lugs 10 and spindle 17, or to separate lugs and spindles, a T-shaped folder 18 (Figs. 7, 8, 9, 10,) capable of adapting itself to the accidental irregularities,—if any,—in the contour or taper of the exterior of the jar. The T-shaped folder (Figs. 9 and 10) is provided with a horizontal spindle or pivot 19 and also with a projection 20 arranged to act as a stop for limiting the vertical oscillating movement of the folder. The horizontal spindle 19 is mounted in a boss or bearing 21 formed for its reception on a vertical carrier boss 22 which in turn is jointed to the movable side $z$ of the pocket $y$ by spindle 17. The T-shaped folder 18 is provided with an arm or lever 23 by which it is connected by a link 24 to the body or plate portion of the jar wheel $x$, thereby enabling the movement that is employed for opening and closing the movable side $z$ of the pocket to be used for operating the T-shaped folder 18. The movable side $z$ and T-shaped folder 18 are operated at different speeds,—as hereinafter described,—or, if desired, they may be separately and independently operated from any moving part of the machine. The T-shaped folder is employed for aiding in folding the intermediate portion,—that is when a gummed wrapper is employed,—to be first placed on the periphery or exterior of the jar and to be held there by spring 12. The fixed cam 4 employed for opening the movable sides $z$ of the pockets $y$ is arranged to be supported either above or below the jar wheel. In the drawings it is shown supported from above by means of a number of pendant rods, say, three, 25, 25, 25, fixed to the platform $d$. If the fixed cam 4 is supported from below it will be carried upon suitable rods or pillars fixed to the table of the machine. As the jar wheel $x$ is rotated the runners 3 come in contact with the outer surface of the fixed cam 4 and retain the movable side $z$ in an open position, until the anti-frictional roller 3 approaches the opposite end of the cam 4, it then comes in contact with a cam shaped lever 26 mounted upon one of the pendant rods 25, in such a position that it will be clear of the rotation of the end folder. When the anti-frictional roller 3 passes off the end of the cam path 4 it comes in contact with the end of cam shaped lever 26 which is then in the position shown at Fig. 6 in order to keep the movable side $z$ of the pocket $y$ open for the reception of the jar and its wrapper. As soon as the latter is within the pocket $y$ the cam shaped lever will be moved into the position shown at Fig. 7 thereby permitting the movable side $z$,—and parts connected therewith,—to close upon the exterior of the jar for retaining it within the pocket $y$.

The cam shaped lever 26 is at Figs. 5 and 6 made to move clear of the anti-frictional bowls 3 (Fig. 7) for permitting the movable side $z$ to close on to the exterior of the jar by the following mechanism, namely, a bell-cam 27 is mounted and fixed on the vertical shaft $h$ and an anti-frictional bowl 28 mounted upon lever 29 is arranged to engage with the said cam. The lever 29 is fulcrumed to a vertical rod 30 fixed to the table $b$, or to a bracket secured thereto. The free and outer end of the lever 29 is connected by a rod 31 (Fig. 5) to the cam shaped lever 26. Another method of operating the cam shaped lever 26 is shown at Fig. 6 and consists in operating the said lever by connecting the rod 31 to a double ended lever 32 fulcrumed to a pin 33 carried by bracket 34 fixed to one of the pendant rods 25. The opposite end of the double ended lever is connected by a second rod 35 to the projection 36 of the cam shaped lever 26. In each pocket $y$ is also formed a vertical recess 39 (Figs. 6 and 7) for the reception of an ejector plate 40 which is shaped to fit the contour of the jar. The ejector plate is mounted upon a spindle 41 working in a horizontal boss 42 (Fig. 18) formed on, or fixed to the plate of the jar wheel $x$. The movement of the spindle is controlled by the friction arrangement consisting of a pad 43 (Fig. 18), spring 44, and adjusting screw 45 mounted on the boss 46 formed on, or fixed to the jar wheel.

An intermittent outward movement of the ejector plate is imparted by lever 47 (Fig. 6) through bowl or runner 48 mounted on pin 49 fixed to the spindle 41. The pin 49 forms part of a guide and works in a slot 50 (Fig. 18) thus keeping the ejector plate 40 in a working position.

The wrapper 51 (Figs. 7 and 12) is fed to the machine in single sheets, or cut off a continuous roll 52 (Fig. 1) of paper or other wrapping material. The roll 52 is mounted at the back of the machine upon a shaft 53 and held in position by means of cones 54 (Fig. 3). The shaft is carried in bearings on the brackets 55 fixed to the framework. The paper from the roll 52 is led first in an upward direction over roller 56 and between the gum transferring roller 57 (Fig. 1) and measuring roller 58, adjustable gripping roller 59, and then over guide plate 60 (fixed to the platform $d$) and horizontally over guide roller 61 to the drawing rollers 62, 63,—the latter roller is made adjustable,—which are arranged to keep the paper taut so that it can be cut off when in a downward and vertical position on the opposite and front side of the machine, that is, on which the roll is placed. As the paper travels from the roll 52 to the drawing rollers 62, 63 the gum or other mucilage is applied thereto by the gum transferring roller 57,—as the paper passes between the said roller and the measuring roller 58,—at the required distance from the edge,—as at 64 (Fig. 12),—of the paper for the vertical seam. The gum or other mucilage is placed in the box 65 which is fixed to the bracket 55. In the gum box 65 is mounted a roller 66 for raising the gum and against the periphery of which the transferring roller 57 works for receiving the supply to be placed upon the traveling paper.

An intermittent rotary motion is imparted (as shown at Fig. 1) to the measuring roller 58 from the driving shaft $f$ through eccentric 67, connecting rod 68, slotted ratchet lever 69 mounted upon shaft 70, pawl 71, ratchet wheel 72, spur wheel 73 mounted on shaft 70, spur wheel 74 mounted on the end of the measuring roller shaft 75 and from thence by a second spur wheel 76 (Figs. 2 and 3) mounted on the opposite end of measuring roller shaft 75, intermediate spur wheel 77 mounted and fixed upon the gum transferring roller shaft 78 to spur wheel 37 mounted upon the gum raising roller shaft 79. Above the measuring roller and mounted in adjustable bearings 80 is arranged a roller 59 for gripping the paper as it passes over the measuring roller 58.

A rotary motion is imparted to the roller 59 from spur wheel 76 mounted upon the measuring roller shaft 75 which is made to gear with a spur wheel 82 mounted upon the gripping roller shaft 83 (Figs. 1 and 2). The rollers 59, 61, 62 and 63 may be recessed, if so desired, as shown at 81 and 84 (Figs. 3 and 12) for the passage of the strip of gum so as to prevent it being transferred to the periphery of the roller and damaging the paper.

In order to impart the required intermittent rotary motion to the drawing rollers 62 and 63 motion is transmitted from the sprocket wheel 85 (Fig. 3) on the measuring roller shaft 75 through endless chain 86 (Figs. 2 and 3) and sprocket wheel 87 mounted upon a stud 88 carried by bracket 89 fixed to the platform $d$. On the stud 88 is mounted a second sprocket wheel 90 which is attached to sprocket wheel 87 and motion is transmitted from sprocket wheel 90 through endless chain 91 to a sprocket wheel 92 mounted on the shaft 93 of the drawing roller 62. Drawing rollers 62 and 63 are geared together by spur gearing 94. The endless chains 86 and 91 are kept taut by means of the sprocket wheels 95 and 96 carried respectively by the brackets 97 and 98. After the paper 52 leaves the drawing rollers 62, 63 it passes between the guillotine knives 99, 100 (Figs. 1 and 4). The guillotine consists of a bar or blade fixed to the pillars $e$. The knife 100 is provided at one end with a guide piece 101 which projects in front of the cutting edge of the knife and passes under the blade 99. The projection 101 is made of such a length that it is never out of contact with the said blade. The knife 100 is mounted horizontally upon a pair of brackets 102 mounted loosely upon the shaft 103 and carried in the adjustable supports 104, the spindles 105 of which pass through the ends of levers 106 carried upon the shaft 107 which is mounted in bearings provided for its reception in the pillar $e$. Each bracket 102 is provided with a projection 108, and each support 104 is provided with a similar projection 109. A pin 110 fixed in projection 108 is arranged to pass through the projection 109, and a spring 111 is interposed between the said two projections for keeping the knife projection 101 and the cutting edge of knife 100 in contact with the undersurface of the blade 99.

An intermittent oscillating movement is imparted to lever 106 and the knife 100 and parts connected therewith from cam 112 (Fig. 2) mounted upon the vertical shaft $h$ through bowl or runner 113 mounted upon lever 114 fixed upon shaft 107.

Before the lower portion of the continuous roll of paper 52 has been cut off, to form a wrapper 51, by the guillotine knife 100 the paper is made to pass through a pair of guides 115 (Fig. 12) adjustably fixed at required distances apart. The guides 115 have a recess 116 formed in one or both of them. The said guide or guides is or are fixed at a suitable distance above the cutting edge of the blade 99 and the edges of the pendant portions of the paper are arranged to pass between the guides 115 and knife 99 for preventing the paper from moving backward or forward when its lower portion has been severed to form a wrapper 51. Before the wrapper 51 is severed from the roll 52 it is held in position by a pair of gripping fingers arranged as follows:—One of the grippers is made a fixture to one of the pillars $e$, and it consists of a fixed jaw 117 and a movable jaw 118. The movable jaw 118 is fulcrumed to the fixed jaw 117. The other gripping fingers are made movable, and consist of a fixed jaw 119 which forms part of an oscillating lever 120 to which is fulcrumed a movable jaw 121. The oscillating lever is fulcrumed upon a stud 122 carried by a bracket 123 fixed to one of the pillars $e$ in any suitable position between the guillotine blade 99 and the top of the table $b$. The said lever is operated by a cam 124,—mounted upon the vertical shaft $h$,— by means of runner 125, bell crank lever 126 fulcrumed upon a stud 127 carried by bracket 128 fixed upon rod 30. The bell crank lever 126 has the runner 125 at one end and at the other end is provided with a universal joint to which link 129 is attached and which link connects to the oscillating lever 120 (see Fig. 23). To open and close the movable jaw 121 the said jaw is provided with an arm 130 having an antifrictional roller 131 adapted to work against a cam path 132 mounted upon, and forming part of, a rock lever 133 which is fulcrumed to a pin 134 fixed to a bracket 123. The shorter arm of the bell crank lever 133 is provided with a runner 135 adapted to engage with a cam 136 mounted and fixed upon the vertical shaft $h$. The movable jaw 121 is provided with an arm 137 mounted upon a stud 138 to which is connected one end of a flexible cord or wire 139 which is adapted to pass partly around pulleys 140 and 141 and to be attached to rod 142 which passes through boss 143 formed on the underside of the table $b$ and to be controlled by the action of spring 144. The spring 144 retains the movable jaw 121 when closed in contact with the wrapper 51, and also runners 125, 131 and 135 in contact with their respective cams 124, 132 and 136. The movable jaw 118 of the stationary gripper 117,—which forms part of bracket 145,—is fulcrumed to bracket 145 and is provided with a lever 146 for connecting it by means of a spring controlled rod 147 to an arm 148 fixed to, or forming part of the bell crank lever 133 so that any movement imparted to the bell crank lever by the cam is at once transmitted to the movable jaw 118 thereby effecting the opening and closing of the two jaws 121 and 118 at the same time. A larger opening movement is imparted to the jaw 121 than to jaw 118 so that it shall be moved clear of the gummed surface 64 on the wrapper.

On the opposite side of the table of the machine to that on which the roll is placed is arranged a horizontal feed trough 149 (Figs. 1 and 5) in which the jars intended to be inclosed in wrappers are placed in on their ends, that is to say, in a vertical position at suitable distance apart. The trough 149 is U-shaped in cross section (Fig. 1) and is provided with a flat stationary bottom, and is fixed by brackets to the table $b$. On the outside of the trough, but independent thereof, are arranged parallel with its outer vertical sides two horizontal rods 150, 151. Rod 150 is mounted so as to slide freely in brackets 152, 153 fixed to the front edge of the table $b$. Bracket 153 is double and forms at one end a guide for rod 151. The rods 150 and 151 are connected together by a number of brackets 154 fixed upon the rod 150 and by passing the end of rod 151 through the upper portion of the bracket 153 the rod 151 is retained in its working position.

A reciprocating motion is imparted to both rods 150 and 151 from a bell cam 155 mounted upon the cam shaft $g$ through runner 156 mounted on lever 157 attached by link 158 to boss 159 fixed upon the rod 150. The lever 157 is fulcrumed either to the framework $a$ or to a bracket 160 fixed on the stay rod 161. A reciprocating motion is transmitted from rod 150 to rod 151 by brackets 154 fixed upon rod 150 by collars 162 on rod 151 and levers,—hereafter termed pushers,—163. The pushers 163 are fixed upon rod 151 at regular distances apart, which distance is regulated by the size of the jar 38. The pushers are made of such a length that when they are turned into a horizontal position they form a barrier or division piece across the trough 149. The number of pushers employed will be determined by the length of the rod 151 and trough 149.

An intermittent oscillating or rocking motion is imparted to the shaft 151 in addition to the reciprocating motion for turning the pushers across the trough from cam 164 fixed on the driving shaft through runner 165, bell crank lever 166 fulcrumed on the stay 161, and controlled by spring 167,—the ends of which are adjustably connected to the swiveling pins 168, 169 respectively on levers 166 and the framework $a$,—connecting rod 170, lever 171 oscillating on the boss of bracket 153 and having a stud 172 adapted to engage with the bifurcated end arm of one of the pushers 163 for causing the shaft 151 to rock or turn in its bearing. The pushers 163 are turned across the trough for raising the jars when it is required to cause them to travel step by step,—toward the opening 173,—but before the return movement of the rods 150 and 151 take place. The pushers are turned into a vertical position (shown at Fig. 1) clear of the jars for permitting that movement of the rod taking place without effecting the position of the jar in the trough.

A jar 38 is placed on its end either by hand or automatically by means of an endless belt,—not shown in the drawings,—within and at one end of the trough 149 when the pushers 163 have been moved across it. On the rods 150 and 151 being intermittently reciprocated the jars 38 are caused to travel step by step forward in the trough until each one is opposite to the opening 173 (Fig. 5), and when in this position it is acted upon by a plunger 174 which pushes the jar out of the trough onto a movable platform 175 (Fig. 7) and into one of the pockets $y$. The opening 173 in the side of the trough also permits of the free working of the plunger 174. The pushers 163 may, when required, but not necessarily so, be covered with india-rubber or woven textile material so as to deaden the noise that would be caused when the metal arms come in contact with the jars 38.

The platform 175 is fixed to, or forms part of a lever 176 (Fig. 7) which is fulcrumed to the table and receives an intermittent reciprocating motion from cam 177 (Fig. 2) mounted upon vertical shaft $h$ and arranged to act upon a runner 178 for moving the platform 175 to or from the trough 149. The movement of the lever 176 is controlled by a spring 179 fixed at one end to an arm 180 and at its opposite end to the table $b$.

The plunger 174 employed for pushing the jars from the trough into the pocket $y$ is mounted so as to slide freely upon a circular rod 181,—arranged at or about a right angle to the trough,—which is carried by boss 182 of bracket 183,—fixed to the table $b$,—and in order to prevent the plunger 174 falling out of position a bar 184,—forming part of, or fixed to the bracket 183,—rectangular in cross section is fixed to the bosses 182 and is arranged to pass into a recess formed for its reception in the plunger 174.

An intermittent reciprocating motion is imparted to plunger 174 from cam 185 by means of runner 186 mounted upon lever 187, the upper end of which is connected by link 188 to the plunger 174. The runner 186 is retained in contact with the edge of cam 185 by spring 189 adjustably connected respectively to the lever 187 and to an arm 190 on stud 191. The lever carrying the platform 175 and plunger 174 are arranged to work together so that when the plunger is pressing the jar 38 out of the trough 149 and into a pocket $y$ the small platform will at the same time be caused to travel forward for enabling the platform to support the jar until it has been gripped by the movable sides $z$.

To fold the gummed portion of a wrapper on to its ungummed portion and during the intermittent rotation of the jar wheel $x$ from the position in which a jar 38 is placed in one of its pockets and to the point at which the ends of the wrapper are folded on to the top and bottom of the jar, the gummed portion of the wrapper is acted upon by a number of guides 192 fixed to the end of a spring controlled lever 193 fulcrumed to the vertical rod 30.

An intermittent oscillating motion is imparted to lever 193 from cam 194 mounted and fixed upon the vertical shaft $h$ through runner 195 mounted upon the said lever. The runner 195 is kept in contact with cam 194 by spring 196 mounted upon rod 197, the ends of which are carried in the projection 198 forming part of, or fixed to one of the pillars $e$, and the opposite end of rod 197 is carried by eye bolt 199 mounted in the arm 200 of lever 193. The guides 192 are employed for turning the gummed portion of the wrapper 51 into position to be acted upon by a number of spring controlled rollers 201 carried on lever 202 and fulcrumed to lever 193. The spring 203 which controls lever 202 is mounted upon an eye bolt 204 secured to the lever 193. A guide 192 is as a rule interposed between two rollers 201, and the number of guides and rollers will vary with the size of the jar and wrapper operated upon. For closing the top and bottom projecting edges of the wrapper 51 over the top and bottom of jar 38, if a square or rectangular jar is employed then any convenient arrangement of ordinary end folders, such as employed for closing the ends of packets on a packaging machine, may be employed and arranged to work in suitable guides provided for their reception on the top of the table $b$, or attached to the underside of platform $d$; but when a circular jar 38 is to be inclosed in a wrapper then it is preferred to employ the rotating folders illustrated at Figs. 14 to 18 which not only rotate upon their own pivot but the arms upon which they are mounted also rotate around the jars.

A convenient method of arranging the rotary folders is to mount a pair of arms 205, 206 (Fig. 18) respectively at suitable distances apart above and below the pocket $y$ of the jar wheel $x$. The arms 205, 206 are mounted upon studs 207, 208 fixed respectively to the platform $d$ and table $b$. As the means for rotating each arm is the same for both of the arms 205 and 206 means will be described for imparting the rotary motion to arm 205, it being understood that a duplicate set of means employed is required for arm 206. On the vertical shaft $h$ is mounted and fixed a spur wheel 209 arranged to gear into a train of wheels comprising two intermediate wheels 210, 211 and a pinion 212 fixed to the arm 205. The intermediate wheels are carried by pendant studs fixed to the stay 213 which is mounted at one end upon the vertical shaft $h$ and supported at the other end by a pendant stud 207. A second train of intermediate wheels are mounted upon studs fixed to the table for rotating arm 206. To arm 205 is fixed a pendant stud 214 upon which is mounted the top rotary folder 215. The stud 214 acts as a pivot upon which the folder 215 rotates and a rotary motion is imparted to the said folder by means of a spur wheel 216 being fixed upon the boss 217 of the folder. The wheel 216 is arranged to gear with a stationary pinion 218 fixed to the lower end of the stud 207. As the arm 205 rotates it carries with it the rotary folder 215 and by the wheel 218 being stationary and geared with spur wheel 216,—fixed to the rotary folder,—the latter is caused to rotate on the sun and planet principle with the rotation of the arm.

Each folder comprises a number of radiating blades 219 (Fig. 14), say, for example, six, more or less, attached to bosses 217 with a space 220 between them. A blade is provided for each fold. The blades 219 are made of different lengths and they are enlarged and suitably shaped at their outer end for first forming the fold,—as shown at Figs. 14 and 15,—and afterward laying each fold of the wrapper in succession upon the flat end of the jar.

It will be understood that the arms and the enlarged end,—as shown at Fig. 14,—or their folding portions are shaped to make and clear the folds as required. A convenient shape for the ends of the arms 219 is as shown in the said figure. The blades of each end folder only occupy a portion of what would otherwise have been a complete circle of blades, and are so geared that the arms 205 travel twice around while the folders on spindles 214 make one revolution,—which is equal to one revolution of the driving shaft $f$. The folders thus make two different epicycloidal curves, one for each revolution of the arms. In the diagram shown at Fig. 22 the centers of the jar are indicated by chain dotted lines 221, the full lines 222 of the diagram show approximity the path of a point on the perimeter of one of the blades 219 during the first revolution of the arms 205, 206; the dotted line 223 shows approximately the path of the same point during the second revolution of the said arms. If the wiping operation is to be effected by wipers (not shown) fixed relative to the can the turning of the jar 38 may be effected by fixing lever 289 on shaft 257 and attaching a connecting rod 290 at one end to the universal joint 291 attached to lever 289. The opposite end is attached by a second universal joint 292 connected to lever 293 controlled by spring 294 mounted on rod 295 attached at one end to the table $b$. The required intermittent oscillating motion is obtained from a cam 296 mounted upon cam shaft $g$ and arranged to act upon bowl or runner 297 carried by the lever 298 fixed to shaft 255.

The blades and arms 219 are of different lengths, and blades 224 and their arms are made longer than the rest to assist in forming the last fold and for wiping the other folds down. The above described ratio of the arms, gearing, and folders may, however, be varied or altered as circumstances require.

One or both of the end folders is or are arranged to be adjusted to the slightly varying heights of the jars to be wrapped. In the drawings the top end folder only is shown capable of adjustment.

The stud 214 (Fig. 16) is prolonged and provided on its upper end with a collar 225 having a circumferential groove 226 formed therein. In the said groove two bowls or runners 227 (Fig. 17),—mounted in arms of the forked lever 228, fulcrumed at 229 to the arm 205,—are arranged to work. On the opposite end of lever 228 is mounted a bowl or runner 230 arranged to work against stationary cam 231 fixed to the stay 213. As the arm 205 rotates the cam 231 acts upon the bowl 230 and depresses end 232 of the lever 228 thereby raising the opposite end of the lever, and runners 227 and stud 214 for lifting the arms 219 of the rotary folder clear of the jar.

At Fig. 18 a modified arrangement for adjusting the top rotary end folder to its work is shown. In this arrangement the arm 205 is provided with a pendant portion 233 upon which is mounted a runner 234 adapted to engage with a cam 235 fixed to the spur wheel 216. On reference to Fig. 18 it will be seen that the face of the spur wheel 218 is about double the width of the face of the spur wheel 216 to permit of the rising and falling of the rotary folder upon its fixed stud 214. The rotary folder is prevented from working off its stud by the runner 234 when the folder is not in contact with the top of the jar. During the movement of the jar wheel $x$ to another position,—say between its second and third movements,—a pair of end wipers 235 (Figs. 6, 7 and 19) are provided and mounted upon a shaft 236 carried in a bearing 237 formed on or fixed to the table $b$. In some cases the moving wipers are dispensed with and a pair of horizontal wipers,—not shown in the drawings,—are fixed respectively to the table and platform, or other suitable portion of the machine so that the folds on the top and bottom of the jar are kept in position until they reach the next stopping place of the jar wheel and to be acted upon by the pressure and turning motion. The shaft 236 is arranged to project below the table and on it is fixed a lever 238 to which is attached a connecting rod 239 attached at its opposite end to lever 240 fulcrumed to a stud 241 fixed to the framework of the machine. The connections of rod 239 with levers 238 and 240 are made with universal joints of any suitable construction. On the lever 240 is mounted a runner 242 adapted to engage with a cam 243 mounted and fixed upon the cam shaft $g$. A spring 244 fixed at one end to the framework and at its other end to lever 240, is employed for keeping the runner 242 in contact with the cam 243.

As the jar with the wrapper folded upon its ends,—as shown at Figs. 7 and 19,—is moved toward and clear of the wipers 235 the wipers begin to move inward in the direction of the arrow, the cam 243 being suitably shaped to keep the wipers in contact with the last fold of the wrapper until they reach the position at which the jar wheel next stops. During the said movement of the jars the vertical seam of the wrapper comes in contact with brush 245 mounted upon a bracket 246 fixed to the table $b$. As soon as the wrapped jar reaches the stationary position the movable side $z$ of the pocket $y$ releases its hold upon the jar 38, as shown at Fig. 7, but prior to the ejecting of the jar by the pusher 41 it may be turned in the pocket for bringing the vertical seam into the correct position for receiving the label, which may be applied to the positioned can in any suitable manner. The jar 38 is first raised by a rubber or other covered pad 247 (Fig. 20) mounted upon the end of rod 248 arranged to slide in a bearing 249 fixed to the table b. On the lower end of the rod 248 are fixed two collars 250 between which and mounted upon the rod, is a sleeve 251 having a horizontal pin 252 projecting from opposite sides. On the said pins are mounted links 253 connected at their opposite end to bell-crank lever 254 fulcrumed upon the shaft 255. The required pressure for lifting and pressing the jars against a second rubber pad 256 mounted on the shaft 257 is obtained by means of spring 258, one end of which is adjustably connected to the bell-crank lever 254 and the other end to the table b. In order to remove the pressure from the jar and to depress the rubber or other covered pad 247, on the free end of the bell-crank lever 254 is mounted a runner 259 adapted to engage with the cam 260, and as the cam rotates by pressing the runner outward the pad is depressed.

The turning of the jar may be effected by the same means that has already been described for opening the movable side z of the pocket y, and in order to cause the two pads 247 and 256 to move simultaneously to the pads are respectively fixed the arms 261, 262, and to arm 262 is fixed a pendant rod 263 which is arranged to pass through a hole or slot in arm 261 and the rod is arranged to project below its lower surface.

Between the points at which the wrapped jar 38 is pressed and where it is ejected from a pocket y is fixed to the top of the table a platform 264 mounted upon brackets 265 (Fig. 1). The platform 264 is shaped as shown at Fig. 5 and is provided with a hole 266 through which the rubber pad 247 can pass. The platform is provided with an upstanding stay 267 along its outer side, shown in plan at Fig. 5. When a pocket y reaches the ejecting position the movable side z will have been further opened, as shown at Fig. 7 in order to permit of the ejector plate 40 pushing the jar out of the pocket y on to the platform in position to be acted upon by the ejector 268.

The required intermittent motion to the ejector plate 40 is imparted by a lever 47 mounted upon the shaft 269 (Fig. 6) carried in brackets 270 fixed to the table b. The lever 47 is provided with a cam path 271 adapted to engage with a runner 48 which is mounted upon the pin 49 fixed to spindle 41. The required intermittent oscillating movement is imparted to lever 47 and shaft 269 from a cam 272 (Fig. 11) mounted upon the vertical shaft h through bell crank lever 273 fixed on the vertical rod 30. The bell crank lever 273 is provided with a runner 274 which engages with the cam 272 and the opposite end of the bell crank lever 273 is connected by a rod 275 with lever 276 fixed to the lower end of shaft 269. The runner 274 is kept in contact with cam 272 by means of spring 277 mounted upon the sliding rod 278 working in the bearing 279 fixed to the table b. The ejector 268 (Fig. 5) is mounted upon the horizontal sliding rod 280 carried in bearings 281 forming part of, or fixed to the side of the platform 264. On the rod 280 is fixed the boss portion 282 (Fig. 1) of the ejector 268 and a recess 283 (Fig. 3) is formed in the ejector which slides in the top of the stay 267 for keeping the ejector in its working position.

An intermittent reciprocating motion is imparted to the ejector rod 280 from the driving shaft f through cam 284, runner 285, mounted on lever 286, and link 287 attached to the boss of the ejector 268. The front end of the ejector is made slightly curved to suit the contour of the jar and may or may not be covered with rubber as required. The jar is pushed by the ejector along the platform 264 through an opening 288 in the inner side of trough 149 (Fig. 5) into and between a pair of pusher levers 163 and they are carried forward step by step as previously described. After the jars have passed into the trough 149 they may, if desired, be carried to a labeling machine when a second or additional label is required to be placed upon the wrapper for denoting the contents of the jar.

In the hereinbefore described jar wheel the pocket y that receives the jar in the first instance is marked in the plan views (Figs. 6 and 7 of the drawings) as No. I position. The second position (No. II) is where the vertical seam is closed and the ends of the wrapper folded on to the ends of the jar. The third position (No. III) is where the end pressing and turning of the jar takes place, and the fourth position (No. IV) is where the wrapped jar is ejected from the pocket y.

It will be understood that although a gummed wrapper is described as being used the mechanism is equally adaptable for acting upon in a similar manner with wrappers that are un-gummed.

At Fig. 21 is shown a duplication of the arrangement for a jar wheel with eight pockets y in order that two jars may at the stages I, II, III, and IV be acted upon simultaneously as described in the views 1 to 20 of the accompanying drawings. This arrangement of apparatus where the two operations at each stage are simultaneously performed are known as twin or duplex machines, and in some cases the operative parts will require to be linked or connected together, that is, arranged to work synchronously.

Although the example hereinbefore described is one in which the ends as well as the sides of the jars are wrapped in paper it will be understood that the present invention is applicable to cases in which the sides without the ends are to be encircled by paper, which might, for instance, be a label; in this case the devices for folding and wrapping at the ends of the receptacle will be dispensed with. Also in some cases the hereindescribed grippers for holding the paper may be dispensed with, in which case the ejector 40 will require to have a greater outward movement imparted to it for gripping the wrapper 51 on to the jar before it is severed from the roll 52.

The action of the machine is as follows: The jars 38 are placed open end upward by hand or automatically in the trough 149 between a pair of pushers 163. An intermittent reciprocating motion is imparted to the pushers 163 as previously described and the jars are made to travel along the trough step by step until they come opposite to the opening 173 when they are in a position to be acted upon by the pusher 174. Previous to the jar being acted upon by the pusher 174 the paper or other material of which the wrapper is formed will have been led from the continuous roll 52 between the gum transferring roller 57 and the measuring roller 58 and over guide roller 61 and to and between the drawing rollers 62, 63 from which it passes in a downward direction through the guides 115 and between the gripping fingers 117, 118, 119 and 121 where it is held until the wrapper portion 51 is severed off by the inward movement of the guillotine knife 100, and the severed paper is then carried forward and held in position in front of the ejector plate 40 which is then in its outward position in the pocket y at the position I. In this position two of the edges of the wrapper 51 will be above and below the level of the top and bottom of the jar. As the pusher 174 causes the jar to pass out of the trough 149 it is pushed on to the movable platform 175 which then travels with the said pusher for preventing the jar from falling out of position. The movable platform remains stationary while the pusher is completing its outward movement for thrusting the jar with the wrapper 51 in front of it into one of the pockets y. As the pusher returns to its normal retracted position the movable platform remains in its inward position until the movable sides z have brought the rollers 8 into contact with the jar. The movable platform is then withdrawn to the position shown at Fig. 7. The further movement of the sides z then cause the T-shaped folder 18 to press the wrapper on to the jar. When a wrapper is thrust into a pocket y as just described the ejector plate 40 will be pushed back into the recess 35 in the pocket y. As the jar is being forced into a pocket it passes the spring controlled runners 7 and 8 for keeping the wrapper tight around the back portion of the jar. When the jar has been fully placed in the pocket,—as shown at position I, Fig. 7,—and the movable side z closed, the ends of the wrapper will be in the position shown but as soon as the movable platform 175 is returned to its normal position the long and gummed projecting portion of the wrapper will then pass nearer to the shorter and ungummed portion thereof. The jar wheel $x$ is now moved from position I to position II, and as it travels the projecting ends of the wrapper are first brought in contact with the guides 192 which form the gummed end into a suitable shape for being closed on to the ungummed portion by the rollers 201. When in this position the blades 219 of the rotary end folder 215 are then brought into action for producing the six folds, as shown at position II, and as previously described. As the jar wheel passes from position II to III the wipers 235 are brought into action for keeping the folds in position in which they arrive at position III where they pass between the rubber covered pads 247 and 256 and where the end folds are pressed flat and the jar and its wrapper afterward turned into a suitable position for subsequently receiving a label. To accomplish this turning motion the movable jaws and parts connected therewith are partially open and remain open while the jar travels over the platform 264 to position IV. When the latter is reached the ejector plate 40 forces the wrapped jar out of the pocket on to the platform 264 to be acted upon by the ejector 268 and conveyed by it again into the trough 149 to be acted upon by the pushers 163 for conveying it over to the labeling machine or to any other desired point.

What we claim is:—

1. A jar wrapping machine comprising a framework having a table mounted thereon, a trough provided with openings in its sides fixed to the table for receiving the jars to be wrapped, means for causing the jars to be fed step by step to an opening in the trough, a movable platform for supporting the jar during its conveyance from the trough, an intermittently rotating jar wheel mounted over the table provided with a number of pockets for the reception of the jars, means for placing a wrapper in front of a pocket and for pushing it and the jar into the pocket and for folding the vertical edges of the wrapper over each other, rotating folders for simultaneously folding the projecting ends on to the top and bottom of the jar, and means for ejecting the jar from the pocket, a platform for receiving an ejected jar and for returning it to the first named trough as set forth.

2. In a machine of the class described, the combination of a suitable supporting frame, a table mounted thereon, a trough provided with openings in its sides at one side of said frame, means for moving jars in vertical position through said trough step by step toward said openings, an intermittently reciprocated plunger arranged at a right angle to the trough for removing a jar therefrom, a movable table for receiving such ejected jar, an intermittently rotated wheel having a number of jar-receiving pockets therein, spring-controlled levers connected with said pocketed wheel to retain the jars in position and hold the edges of the wrapper around the jar, rotary folders mounted above and below the jar-receiving pockets for folding the projecting ends of the wrapper about the top and bottom of the jar, means for opening the said spring controlled levers at a predetermined point in the rotation of said pocketed wheel, a jar-receiving platform, a plunger for ejecting the jar on to said platform, and an intermittently reciprocating ejector for conveying the wrapped jar back into the feed trough as set forth.

3. In a machine of the class described, the combination of a suitable supporting frame, a table mounted thereon, a trough provided with openings in its sides, means for moving the jars step by step in said trough, a supply roll of wrapping material, a plurality of guiding rollers for said wrapping material, gumming apparatus applying the gum to the wrapping material as it passes between the drawing rollers, means for intermittently drawing the required length of wrapping material from the continuous roll, an intermittently operated guillotine knife for severing a portion of said wrapping material and positioning it adjacent a jar, a jar wheel mounted horizontally upon the table and having therein jar receiving pockets, means for intermittently rotating the jar wheel, means for retaining the jars in the said pockets, rotary folders mounted above and below the jar wheel for folding the ends of the wrappers on to the top and bottom of the jar, and means for imparting an epicycloidal motion to the said folders as set forth.

4. In a machine of the class described, the combination of a suitable supporting frame, a table mounted thereon, an intermittently rotatable pocketed jar wheel above said table, a jar-receiving trough having openings in its side walls, a plurality of connected rods mounted in one of the sides of the trough, one of which is provided with jar-receiving levers, means for intermittently reciprocating said rod, means for oscillating one of said rods, an ejector slidingly mounted with respect to said trough, means for intermittently reciprocating said ejector to push a jar through a trough opening and into a pocket of the jar wheel, a movable platform for supporting the jar during transference from said trough to a pocket, and means for intermittently operating the movable platform.

5. In a machine of the class described, the combination of a suitable supporting frame, a table mounted thereon, a trough for receiving the jars to be wrapped, means for moving the jars step by step in said trough, an intermittently rotatable pocketed jar wheel, an intermittently reciprocating ejector at right angles to said trough to transfer the jars from said trough to the pockets of said jar wheel, a movable platform for supporting the jars during their transference from the trough to said pockets, means for feeding a wrapper from a continuous roll, an intermittently operated guillotine knife, gripping fingers to engage said wrapper during the operation of said knife, means for moving said gripping fingers to place the wrapper in front of one of the pockets of the jar wheel, rotary folders above and below the jar wheel for folding the ends of the wrapper about the top and bottom of the jar, a reciprocating ejector plate within said pocket, and means for intermittently operating said ejector plate to move a wrapped jar from a pocket.

6. In a jar wrapping machine in which the jar is retained in an upright position without disturbing the vertical axis of the article during the sequence of operations, the combination of the framework of the machine having a table mounted thereon, a jar wheel having a number of pockets formed therein and means for intermittently rotating it above the said table, a movable side jointed to each pocket having a horizontal arm projecting therefrom, a runner mounted in said arm adapted to work against a fixed cam for operating the said movable side, a spring for controlling the movement of the said side, recesses formed in the fixed portion of each pocket and also in its movable side for the reception of antifrictional rollers, adjustable spring controlled levers upon which the said rollers are mounted, a T-shaped folder mounted on the movable side having a horizontal spindle and a projection arranged to act as a stop for limiting the vertical oscillation of the folder, an arm or lever fixed to the folder and connected by a link to the body portion of the jar wheel as and for the purposes set forth.

7. In a jar wrapping machine in which the jar is retained in an upright position without disturbing the vertical axis of the article during the sequence of operations, the combination of framework having a table mounted thereon and a horizontal jar wheel with a number of pockets arranged therein, said jar wheel being arranged to be intermittently rotated above and on the said table, a vertical recess formed in each pocket, an ejector plate working therein and mounted upon a rod, a runner carried by the rod, a cam path fixed to the table against which the runner works for pressing the ejector plate into the pocket, a movable side attached to each pocket and means for opening the said pocket, a cam shaped lever mounted upon a pendant rod clear of the end folder, levers, rods and cams for operating the same, a T-shaped folder capable of vertical oscillation mounted upon the movable side, rollers and levers mounted upon the fixed edge of the pocket, a spring controlled lever mounted upon the table of the machine and means for operating the same, said lever having cam shaped guides and spring controlled levers carrying rollers mounted thereon for closing the edges of the wrappers which overlap and a blade for assisting in folding the said edges as set forth.

8. In a jar wrapping machine in which the jar is retained in an upright position without disturbing the vertical axis of the article during the sequence of operations, the combination of a framework having a table mounted thereon, a jar wheel arranged to rotate intermittently and horizontally above the table and having a number of pockets formed therein, a movable side jointed to each pocket and a cam path fixed to said table and means operating in conjunction with the said cam path for opening the movable jaw, means for intermittently rotating the jar wheel, intermittently reciprocating wipers and means for operating the same and a brush mounted on a lever for wiping the vertical seam into position as the jar wheel is rotated, as set forth.

9. In a jar wrapping machine in which the jar is retained in an upright position without disturbing the vertical axis of the article during the sequence of operations, the combination of a framework having a table mounted thereon, a jar wheel intermittently rotating above the said table and having pockets formed therein and means for closing the wrapper on to the side of the jars, rotary end folders for folding and closing the wrapper on to the ends of the jar, each rotary end folder consisting of a number of blades of different lengths and sizes attached to a central boss with a space between the blades for forming the folds, and a flat space for laying the fold, gearing for rotating the folders, a stationary pinion with which the said gearing meshes whereby the rotary folder makes two revolutions to one of the arm to which it is attached, a cam path fixed to the arm, a bifurcated lever fulcrumed to the lever carrying the rotating folder having a runner which works against the cam path whereby the folder is raised and lowered as the said runner works upon the cam path.

10. In a jar wrapping machine in which the jar is retained in an upright position without disturbing the vertical axis of the article during the sequence of operations, the combination of a framework having a table mounted thereon, a jar wheel intermittently rotated above the said table and having a number of pockets formed therein, a movable side attached to each pocket and means for operating the same, a cam path fixed to the table, rotary end folders for closing the ends of the wrapper on to the top and bottom of the jar, and means for raising and lowering the jar comprising rubber covered pads and levers operated by cams for pressing the said pads on to the ends of the jars and for turning the jar into the required position prior to being ejected as set forth.

11. In a machine of the class described, the combination of a suitable supporting frame, a table mounted thereon, a feed trough, an intermittently rotatable jar wheel having pockets therein mounted above said table, means for placing a wrapper in front of a pocket in said jar wheel, means for moving a jar and wrapper into said pocket, rotating end folders to fold the top and bottom of said wrapper on the ends of a jar, a brush for wiping the vertical seam of a wrapper, means for pressing the end folds on the top of the jar and for turning the jar in the pocket, a jar-receiving platform, an ejector within said pocket, and means for intermittently operating said ejector to move the jar from a pocket to said platform.

CHARLES HERBERT DAY.
ALBERT DAY.
JAMES HADCOCK.
ARTHUR BINGHAM.
WILLIAM HENRY NAYLOR.

Witnesses:
W. FAIRBURN HART,
ALICE M. TURNER.